Patented Apr. 11, 1950

2,503,637

UNITED STATES PATENT OFFICE 2,503,637

NONBLOOMING SYNTHETIC RUBBER COMPOSITION

Donald V. Sarbach, Cuyahoga Falls, Ohio, assignor to The B. F. Goodrich Company, New York, N. Y., a corporation of New York No Drawing. Application May 16, 1947, Serial No. 748,673

9 Claims. (Cl. 260—45.5)

This invention relates to a synthetic rubber composition containing a vulcanizable rubbery material in which sulfur is normally relatively insoluble and on which the sulfur normally forms a surface bloom, and containing in addition thereto a second vulcanizable rubbery material which prevents the surface bloom of sulfur without affecting the vulcanization of the composition, and to a vulcanized article made therefrom. The invention is particularly concerned with synthetic rubber compositions adapted for use in making inner tubes or the like which can be vulcanized to yield a soft elastic material which remains free of undesirable sulfur bloom over extended periods of time, and to a non-blooming inner tube made therefrom.

Inner tubes and similar pneumatic articles are desirably made from a rubber composition which combines impermeability to air with the other necessary physical properties of tensile strength, elongation, abrasion resistance, tear resistance, etc. One of the most suitable rubbers for use in such compositions is the synthetic rubber of the type commonly known and hereinafter referred to as "Butyl" rubber and consisting of a solid rubbery hydrocarbon copolymer of a major proportion of an isoolefin having from 4 to 7 carbon atoms with a minor proportion of an open-chain or linear conjugated diolefin having from 4 to 8 carbon atoms, desirably the copolymer of a major proportion of isobutylene, i. e. over 50% by weight, with a minor proportion of isoprene. Preferably the copolymer comprises from 70 to 80 to 99½ parts by weight of an isomonoolefin such as isobutylene or ethyl methyl ethylene copolymerized with from ½ to 20 or 30 parts by weight of an open-chain conjugated diolefin such as isoprene; butadiene-1,3; piperylene; 2,3-dimethyl butadiene-1,3; 1,2-dimethyl butadiene-1,3 (or 3-methyl pentadiene-1,3); 1,3-dimethyl butadiene-1,3; 1-ethyl butadiene-1,3 (or hexadiene-1,3); 1,4-dimethyl butadiene-1,3 (or hexadiene-2,4); the copolymerization being effected by the usual method of copolymerizing such monomers as disclosed in detail in U. S. Patents Nos. 2,356,128, 2,356,129 and 2,356,130 to Thomas and Sparks. Typical examples of these synthetic rubbers are known to the trade as "GR-I," "Butyl A," "Butyl B," "Butyl C" and "Flexon."

In vulcanizing a rubber article, it is necessary to employ an excess of sulfur over that actually entering into the vulcanization cross linkages in order to obtain an optimum degree of vulcanization in a reasonable time and to obviate the possibility of under-vulcanization of the rubber. Sulfur, however, is relatively insoluble in "Butyl" rubber and the free sulfur which is normally found in a sulfur vulcanized composition rapidly migrates to the surface of vulcanized "Butyl" rubber and appears on the surface as a silvery bloom consisting of minute sulfur crystals. In the case of normally black or colored rubber articles, such a bloom seriously detracts from the appearance of the article. Since appearance constitutes a prime factor in the marketability of an article, the problem of preventing bloom assumes great importance in the technology of rubber manufacture.

It is an object of this invention to provide an article combining the desirable physical properties of "Butyl" rubber with the non-blooming characteristics of other rubber compositions without impairing the overall physical properties of the composition. Other objects will be apparent from the description which follows.

I have discovered that if a composition is prepared by mixing unvulcanized "Butyl" rubber with an unvulcanized rubbery copolymer of chloroprene and a diolefin having from 4 to 8 carbon atoms, preferably isoprene, and the resulting mixture vulcanized with sulfur sufficient to effect optimum vulcanization, the resulting sulfur covulcanizate will remain free of sulfur bloom for extended periods of time and the physical properties of the composition will not be adversely affected.

The behavior of such a covulcanizate is totally unexpected in view of the art. The necessary combination of non-blooming characteristics and good physical properties is not attained in a composition consisting of "Butyl" rubber with either natural rubber, a butadiene-styrene copolymer, a polychloroprene, or a butadiene-acrylonitrile copolymer.

A rubbery copolymer of chloroprene with a diolefin having from 4 to 8 carbon atoms may be mixed with "Butyl" rubber, however, without affecting the vulcanization thereof while effectively preventing sulfur bloom. The reason why such copolymers may be used when a butadiene-styrene copolymer is unsuitable is not fully understood and the invention will not be limited by any theories which might be advanced by way of explanation. Suffice it to say that a "Butyl" rubber inner tube composition containing a chloroprene-isoprene copolymer in an amount equal to about 10% of the "Butyl" rubber possesses substantially the same properties as a conventional "Butyl" rubber composition. In addition, the composition remains free of sulfur bloom indefinitely.

A chloroprene-isoprene copolymer is preferably used in conjunction with the "Butyl" rubber, such copolymers including any vulcanizable rubbery copolymer of 2-chlorobutadiene-1,3 and 2-methyl butadiene-1,3 and normally the copolymer of chloroprene with a lesser amount by weight of isoprene. A suitable chloroprene-isoprene copolymer is known to the trade as "Neoprene FR."

Although superior results are obtained using chloroprene-isoprene copolymers in conjunction with "Butyl" rubber, satisfactory results are obtained using copolymers of chloroprene with lesser amounts of other open-chain conjugated diolefins having from 4 to 8 carbon atoms as for example butadiene-1,3; piperylene; 2,3-dimethyl butadiene-1,3; 1,2-dimethyl butadiene-1,3 (or 3-methyl pentadiene-1,3); 1,3-dimethyl butadiene-1,3; 1-ethyl butadiene-1,3 (or hexadiene-1,3); 1,4-dimethyl butadiene-1,3 (or hexadiene-2,4).

The chloroprene copolymer exerts a retardant effect on sulfur bloom when mixed with "Butyl" rubber in amounts as low as 1/40 the weight of the "Butyl" rubber and may be used in amounts as high as 1½ times the weight of "Butyl" rubber. Beyond that point, the desirable physical properties of the "Butyl" rubber tend to be submerged and the "Butyl" rubber acts merely as a diluent for the chloroprene copolymer. The chloroprene-isoprene copolymer is preferably employed in amounts equal to from 7% to 25% of the weight of "Butyl" rubber, in which range the physical properties of the "Butyl" rubber remain substantially unchanged and the incidence of sulfur bloom is practically nil.

In mixing a composition embodying this invention, the "Butyl" rubber and the chloroprene copolymer are thoroughly mixed while both copolymers are in the unvulcanized condition. The mixing may be carried out while both rubbers are in the form of aqueous dispersions or they may be mixed on a mill or in an internal mixer. The homogeneous mixtures are then compounded in accordance with well-known "Butyl" rubber compounding techniques and may contain, for example, sulfur in amounts from 0.5 to 3.0 parts by weight per 100 parts of rubber and any of the commonly employed vulcanization accelerators, fillers, softeners, reinforcing materials, etc. In accordance with usual rubber compounding practice, the rubber amounts to at least 10% by weight of the total weight of the composition and preferably amounts to at least 40% by weight thereof.

The compositions embodying this invention are then calendered, extruded, or molded, etc., in the usual manner to make the desired rubber articles and the copolymers are covulcanized in accordance with conventional vulcanizing cycles. The finished articles are strong and elastic, exhibit marked impermeability to air, and show little or no tendency to bloom.

A typical inner tube composition embodying the invention will be set forth in detail but it will be understood that the invention is not limited by the example given but that the composition may be varied as to the proportions of the copolymers within the limits defined in the appended claims and that the other compounding ingredients may be substituted by and/or supplemented with such other materials as are commonly employed in rubber compounding and the proportions thereof may be varied in accordance with usual compounding techniques for "Butyl" rubber.

*Example*

| Material: | Parts by weight |
|---|---|
| Isobutylene-isoprene rubber (80:20 copolymer) | 90.0 |
| Chloroprene-isoprene rubber (75:25 copolymer) | 10.0 |
| Zinc oxide | 5.0 |
| Carbon black | 50.0 |
| Petrolatum | 3.0 |
| Stearic acid | 1.0 |
| 2-mercaptobenzothiazole | 0.5 |
| Tetramethyl thiuram disulfide | 1.5 |
| Sulfur | 2.0 |
| Total | 163.0 |

The unvulcanized isobutylene-isoprene rubber and chloroprene-isoprene rubber are mixed on a mill and their components are thoroughly dispersed into the mixture. The resulting composition is extruded to form an inner tube blank which is spliced, etc., in the usual manner in making inner tubes. The tubes are vulcanized by heating at 307° F. for 8 minutes. The resulting inner tube is strong, elastic, impermeable to air and has a jet black surface which remains free of sulfur bloom indefinitely.

Similar compositions are obtained when the total rubber consists of 40, 50, 60, 70, 80 and 95% "Butyl" rubber and the remainder of the rubber consists of a chloroprene-isoprene copolymer or other copolymer of chloroprene and a diolefin having from 4 to 8 carbon atoms. Satisfactory results are obtained when such mixtures are vulcanized at temperatures of 250°–350° F. for from 4 to 45 minutes or longer.

The invention has been described in considerable detail with reference to a preferred inner tube composition but it will be understood that these and other compounding ingredients may be used in varying proportions in a composition wherein the rubber consists of the copolymers herein defined and in the proportions set forth in the appended claims.

I claim:

1. A vulcanized article characterized by a surface free from sulfur bloom, said article comprising a sulfur covulcanizate of (1) a rubbery copolymer of a major proportion of an isomonoolefin having from 4 to 7 carbon atoms with a minor proportion of an open-chain conjugated diolefin having from 4 to 8 carbon atoms and (2) a rubbery copolymer of chloroprene with a lesser amount, at least about ⅓ by weight of said chloroprene, of an open-chain conjugated diolefin having from 4 to 8 carbon atoms, present in an amount of from 1/40 to 1½ times the weight of said first-named rubbery copolymer.

2. A vulcanized article characterized by a surface free from sulfur bloom, said article comprising a sulfur covulcanizate of (1) a rubbery copolymer of a major proportion of an isomonoolefin having from 4 to 7 carbon atoms with a minor proportion of an open-chain conjugated diolefin having from 4 to 8 carbon atoms and (2) a rubbery copolymer of chloroprene with a lesser amount, at least about ⅓ by weight of said chloroprene, of isoprene, said last-named copolymer amounting to from 1/40 to 1½ times the weight of said first-named copolymer.

3. A vulcanized article characterized by a surface free from sulfur bloom, said article comprising a sulfur covulcanizate of (1) a rubbery copolymer of a major proportion of isobutylene with a minor proportion of isoprene and (2) a rubbery copolymer of chloroprene with a lesser amount, at least about ⅓ by weight of said chloroprene, of isoprene, said last-named copolymer amounting to from 1/40 to 1½ times the weight of said first-named copolymer.

4. A vulcanized article characterized by a surface free from sulfur bloom and comprising a sulfur covulcanizate of (1) a rubbery copolymer of from 80 to 99½ parts of isobutylene with from ½ to 20 parts of isoprene and (2) a rubbery copolymer of chloroprene with a lesser amount, at least about ⅓ by weight of said chloroprene, of isoprene, said last-named copolymer amounting to from 1/40 to 1½ times the weight of said first-named copolymer.

5. An unvulcanized synthetic rubber composition capable of vulcanization to yield a material characterized by a surface free from sulfur bloom, said composition comprising (1) an unvulcanized plastic hydrocarbon copolymer of a major proportion of an isomonoolefin having from 4 to 7 carbon atoms with a minor proportion of an open-chain conjugated diolefin having from 4 to 8 carbon atoms, (2) from 1/40 to 1½ times the weight of said first-named copolymer of an unvulcanized rubbery copolymer of chloroprene with a lesser amount, at least about ⅓ by weight of said chloroprene, of a diolefin having from 4 to 8 carbon atoms and (3) sulfur in an amount sufficient to vulcanize said copolymers.

6. An unvulcanized synthetic rubber composition capable of vulcanization to yield a material characterized by a surface free from sulfur bloom, said composition comprising (1) an unvulcanized rubbery hydrocarbon copolymer of a major proportion of an isomonoolefin having from 4 to 7 carbon atoms with a minor proportion of an open-chain conjugated diolefin having from 4 to 8 carbon atoms, (2) from 1/40 to 1½ times the weight of said first-named copolymer of an unvulcanized plastic copolymer of chloroprene with a lesser amount, at least about ⅓ by weight of said chloroprene, of isoprene and (3) sulfur in an amount sufficient to vulcanize said copolymers.

7. An unvulcanized synthetic rubber composition capable of vulcanization to yield a material characterized by a surface free from sulfur bloom, said composition comprising (1) an unvulcanized rubbery copolymer of a major proportion of isobutylene with a minor proportion of isoprene, (2) an unvulcanized rubbery copolymer of chloroprene with a lesser amount, at least about ⅓ by weight of said chloroprene, of isoprene, said last-named copolymer being present in an amount equal to from 1/40 to 1½ times the weight of said first-named copolymer and (3) sulfur sufficient to vulcanize said copolymers.

8. An unvulcanized inner tube composition capable of vulcanization to yield a material characterized by a surface free from sulfur bloom, said composition comprising (1) an unvulcanized rubbery copolymer of from 80 to 99½ parts of isobutylene with from ½ to 20 parts of isoprene, (2) an unvulcanized rubbery copolymer of chloroprene with a lesser amount, at least about ⅓ by weight of said chloroprene, of isoprene, said last-named copolymer being present in an amount equal to from 7% to 25% by weight of said first-named copolymer and (3) sulfur sufficient to vulcanize said copolymers.

9. An inner tube characterized by a surface free from sulfur bloom comprising a sulfur covulcanizate of (1) a rubbery copolymer of from 80 to 99½ parts of isobutylene with from ½ to 20 parts of isoprene and (2) a rubbery copolymer of chloroprene with a lesser amount, at least about ⅓ by weight of said chloroprene, of isoprene, said last-named copolymer being present in an amount equal to from 7% to 25% by weight of said first-named copolymer.

DONALD V. SARBACH.

REFERENCES CITED

The following references are of record in the file of this patent:

UNITED STATES PATENTS

| Number | Name | Date |
|---|---|---|
| 2,066,329 | Carothers et al. | Jan. 5, 1937 |
| 2,332,194 | Beekley et al. | Oct. 19, 1943 |

FOREIGN PATENTS

| Number | Country | Date |
|---|---|---|
| 513,521 | Great Britain | Oct. 16, 1939 |

Certificate of Correction

Patent No. 2,503,637 April 11, 1950

DONALD V. SARBACH

It is hereby certified that error appears in the printed specification of the above numbered patent requiring correction as follows:

Column 1, line 33, for "70 to" read *70 or*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*